US012418091B2

(12) United States Patent
Oishi

(10) Patent No.: US 12,418,091 B2
(45) Date of Patent: Sep. 16, 2025

(54) WIRELESS COMMUNICATION UNIT AND ANGLE ADJUSTMENT METHOD

(71) Applicants: NEC Corporation, Tokyo (JP); NEC Platforms, Ltd., Kawasaki (JP)

(72) Inventor: Makoto Oishi, Kanagawa (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 193 days.

(21) Appl. No.: 18/281,665

(22) PCT Filed: Jan. 17, 2022

(86) PCT No.: PCT/JP2022/001284
§ 371 (c)(1),
(2) Date: Sep. 12, 2023

(87) PCT Pub. No.: WO2022/196067
PCT Pub. Date: Sep. 22, 2022

(65) Prior Publication Data
US 2024/0162596 A1 May 16, 2024

(30) Foreign Application Priority Data
Mar. 18, 2021 (JP) ................................ 2021-044792

(51) Int. Cl.
*H01Q 1/22* (2006.01)
*H01Q 1/12* (2006.01)

(52) U.S. Cl.
CPC ............ *H01Q 1/22* (2013.01); *H01Q 1/1264* (2013.01)

(58) Field of Classification Search
CPC ...... H01Q 1/22; H01Q 1/1207; H01Q 1/1242; H01Q 1/1264; H01Q 19/32
See application file for complete search history.

(56) References Cited

U.S. PATENT DOCUMENTS 8,794,578 B2 * 8/2014 Lin ........................ H01Q 1/125 343/890
10,418,683 B2 * 9/2019 Bensen ................ H01Q 1/1264
(Continued)

FOREIGN PATENT DOCUMENTS

JP S63-049808 A 4/1988
JP H10-135719 A 5/1998
(Continued)

OTHER PUBLICATIONS

International Search Report for PCT Application No. PCT/JP2022/001284, mailed on Mar. 15, 2022.
(Continued)

*Primary Examiner* — Tung X Le
(74) *Attorney, Agent, or Firm* — Sughrue Mion, PLLC

(57) ABSTRACT

Provided are a wireless communication unit and an angle adjustment method with which it is possible to adjust an azimuthal angle, elevation and depression angles, and a polarization angle, with a simple structure. This wireless communication unit comprises: an antenna device including an antenna body and an attachment member that includes mechanisms for adjusting an azimuthal angle and elevation and depression angles of the antenna body, and a structure for retaining a to-be-attached member; a wireless communication device disposed on a back-surface part of the antenna device; a circular-arc-shaped guide part formed in the wireless communication device; and a screw member that penetrates the guide part and that is for fixing the wireless communication device to the antenna device. The wireless communication device is rotated relative to the antenna device by the screw member being guided by the guide part in a state where the screw member is loosened.

20 Claims, 13 Drawing Sheets

(56) References Cited

U.S. PATENT DOCUMENTS

| | | | |
|---|---|---|---|
| 2005/0264467 A1 | 12/2005 | Lin et al. | |
| 2007/0177064 A1* | 8/2007 | Lin .......................... | H01Q 3/04 348/838 |
| 2009/0061761 A1* | 3/2009 | Yang .................... | H01Q 1/1264 343/882 |
| 2010/0259462 A1* | 10/2010 | Yeh .......................... | H01Q 3/02 343/882 |
| 2011/0074652 A1 | 3/2011 | Lewry et al. | |

FOREIGN PATENT DOCUMENTS

| | | |
|---|---|---|
| JP | 2005-333234 A | 12/2005 |
| JP | 2006-345015 A | 12/2006 |
| JP | 2012-095244 A | 5/2012 |
| WO | 2017/145961 A1 | 8/2017 |

OTHER PUBLICATIONS

English translation of Written opinion for PCT Application No. PCT/JP2022/001284, mailed on Mar. 15, 2022.
JP Office Action for JP Application No. 2023-506789, mailed on Oct. 22, 2024 with English Translation.

* cited by examiner

WIRELESS COMMUNICATION UNIT AND ANGLE ADJUSTMENT METHOD

This application is a National Stage Entry of PCT/JP2022/001284 filed on Jan. 17, 2022, which claims priority from JP Patent Application 2021-044792 filed on Mar. 18, 2021, the contents of all of which are incorporated herein by reference, in their entirety.

TECHNICAL FIELD

The present disclosure relates to a wireless communication unit and an angle adjustment method.

BACKGROUND ART

PTL 1 discloses a technique related to a structure for adjusting an azimuthal angle, an elevation angle, and a polarization angle in a portable antenna device for communication with an artificial satellite.

Specifically, in the technique described in PTL 1, the portable antenna device includes a tripod, a control device supported by the tripod via a rotation mechanism disposed on top of the tripod, and a planar antenna connected to the control device via an expanding mechanism. The portable antenna device further includes a transmission/reception device integrated with the planar antenna (see paragraph and FIGS. 1 to 4 of PTL 1).

The rotation mechanism includes a base, a guide plate fastened to a bottom surface of the base via a fastening member, and two stoppers that are fastened to the bottom surface of the base via the fastening member and limit a rotation range of a movable leg together with a rotation range limitation member and the guide plate. The rotation mechanism further includes a substantially annular turntable that is disposed coaxially with the base on a top surface of the base and is fastened to a bottom surface of the control device via a fastening member, and can rotate freely. The rotation mechanism further includes a rotation limitation member that limits rotation of the turntable (see paragraph [0044], FIG. 4, and FIG. 5 of PTL 1). An azimuthal angle is adjusted by using the rotation mechanism (see paragraph of PTL 1).

The planar antenna is supported by an antenna supporting member via a polarization angle adjustment mechanism that adjusts a polarization angle of the planar antenna (see paragraph and FIG. 7 of PTL 1). The polarization angle adjustment mechanism includes a polarization angle display member, a polarization angle limitation member, a polarization angle adjustment member, a polarization angle fixing member, and the like (see paragraphs to of PTL 1). The polarization angle is adjusted by using the polarization angle adjustment mechanism (see paragraphs to of PTL 1).

A hole is formed in a central part of the polarization angle limitation member, whereas an elevation angle adjustment member is connected to the central part of the polarization angle adjustment member (see paragraph of PTL 1). The elevation angle adjustment member includes a fixing member that fixes one end of the elevation angle adjustment member to the polarization angle adjustment member, and a turnbuckle to be accommodated in a guide connected to the fixing member. The elevation angle adjustment member further includes an engagement member that engages the other end of the elevation angle adjustment member to an elevation angle fixing member extending from an arm bridge member (see paragraph [0076], FIG. 7, and FIG. 8 of PTL 1). An elevation angle is adjusted by using the elevation angle adjustment member (see paragraphs and of PTL 1).

CITATION LIST

Patent Literature

[PTL 1] Japanese Unexamined Patent Application Publication No. 2005-333234

SUMMARY OF INVENTION

Technical Problem

In general, it has been expected to simplify a structure for adjusting an azimuthal angle, an elevation/depression angle, and a polarization angle.

Herein, as described above, the structure described in PTL 1 includes the tripod, the rotation mechanism, the control device, the expanding mechanism, the planar antenna, and the transmission/reception device. The rotation mechanism installed between the tripod and the control device is used in order to achieve adjustment of the azimuthal angle. The polarization angle adjustment mechanism installed between the planar antenna and the expanding mechanism is used in order to achieve adjustment of the polarization angle. The elevation angle adjustment member installed between the polarization angle adjustment mechanism and the expanding mechanism is used in order to achieve adjustment of the elevation angle. Thus, a large number of components are required to achieve angle adjustment, and therefore there is a problem that it is difficult to simplify the structure.

An object of the present disclosure is to provide, in view of the above-described problem, a wireless communication unit and an angle adjustment method that are capable of adjusting an azimuthal angle, an elevation/depression angle, and a polarization angle, with a simple structure.

Solution to Problem

A wireless communication unit according to one aspect of the present disclosure includes: an antenna device including an antenna body, and an attachment member including a mechanism that adjusts an azimuthal angle and an elevation/depression angle of the antenna body and a structure that holds a member to be attached; a wireless communication device being disposed on a back surface of the antenna device; an arc-shaped guide part formed in the wireless communication device; and a screw member that penetrates through the guide part and fixes the wireless communication device to the antenna device, and the wireless communication device rotates relative to the antenna device while the screw member is guided by the guide part in a state in which the screw member is loosened.

An angle adjustment method according to one aspect of the present disclosure includes: adjusting an azimuthal angle and an elevation/depression angle of an antenna body of an antenna device by using a mechanism included in an attachment member of the antenna device; loosening a screw member that penetrates through an arc-shaped guide part formed in an wireless communication device disposed on a back surface of the antenna device and fixes the wireless communication device to the antenna device; adjusting a polarization angle of the wireless communication device by rotating the wireless communication device relative to the antenna device while the screw member is guided by the guide part in a state in which the screw member is loosened;

and fixing the wireless communication device to the antenna device by fastening the screw member in a state in which adjustment of the polarization angle is finished.

Advantageous Effects of Invention

According to the present disclosure, a wireless communication unit and an angle adjustment method that are able to adjust an azimuthal angle, an elevation/depression angle, and a polarization angle with a simple structure can be provided.

EXAMPLE EMBODIMENT

In the following, an example embodiment of the present disclosure will be described in detail with reference to the accompanying drawings.

First Example Embodiment

Figure 1:
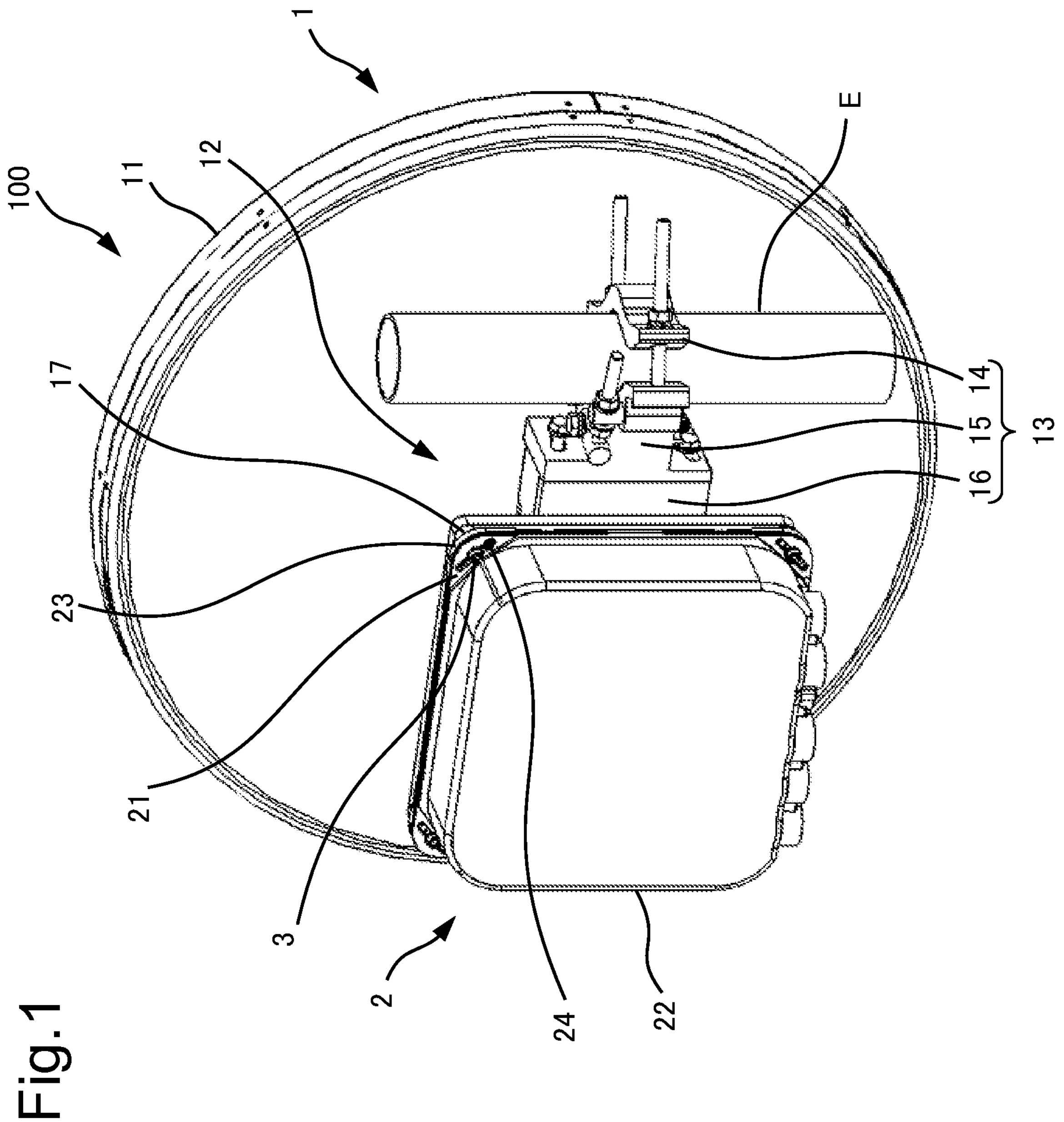
FIG. 1 is an oblique view illustrating a main part of a wireless communication unit according to a first example embodiment.
Figure 2:
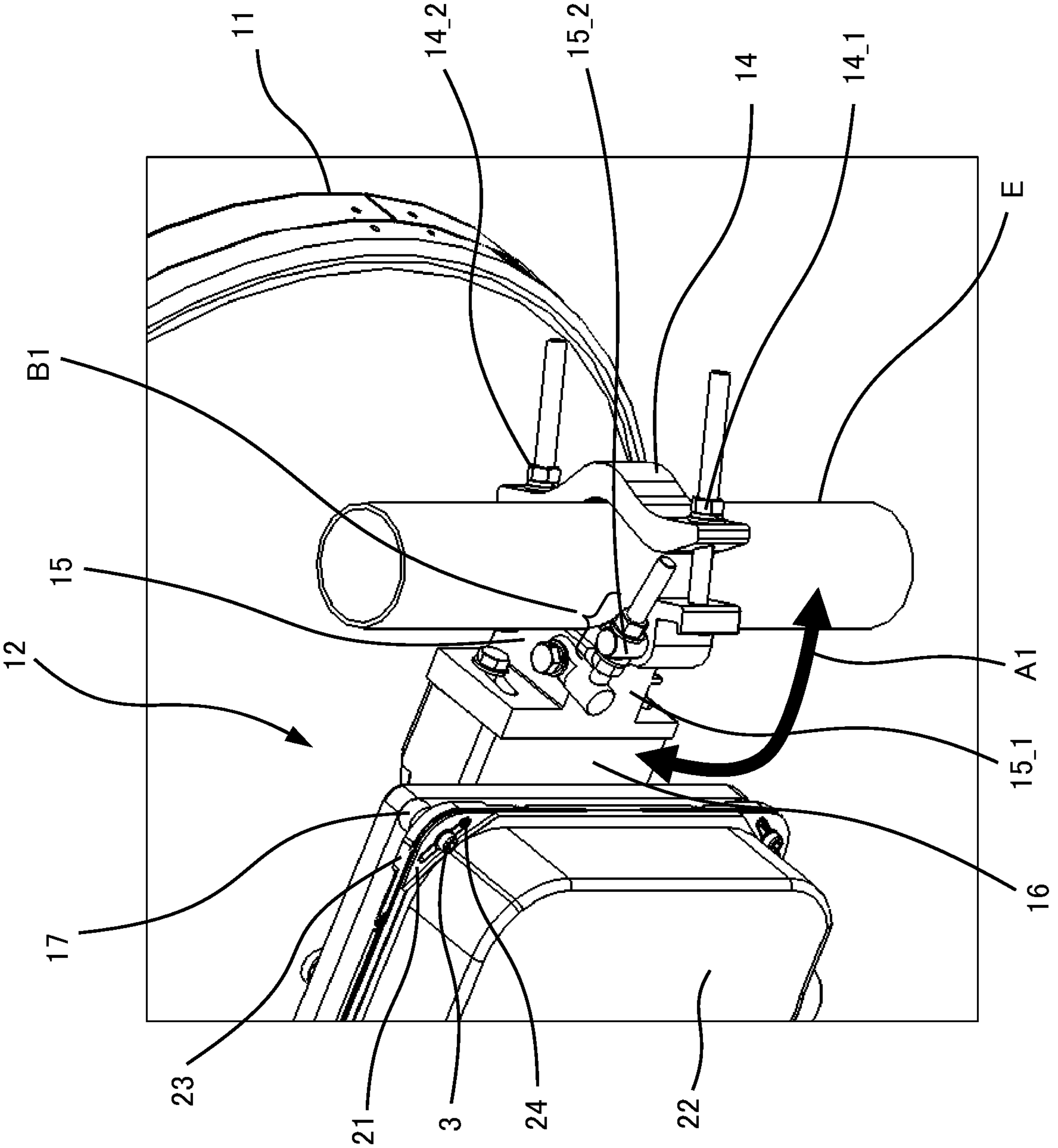
FIG. 2 is an enlarged oblique view of a part including an attachment member in the wireless communication unit according to the first example embodiment, and is an oblique view illustrating an example of a rotation direction relative to an azimuthal angle direction.
Figure 3:
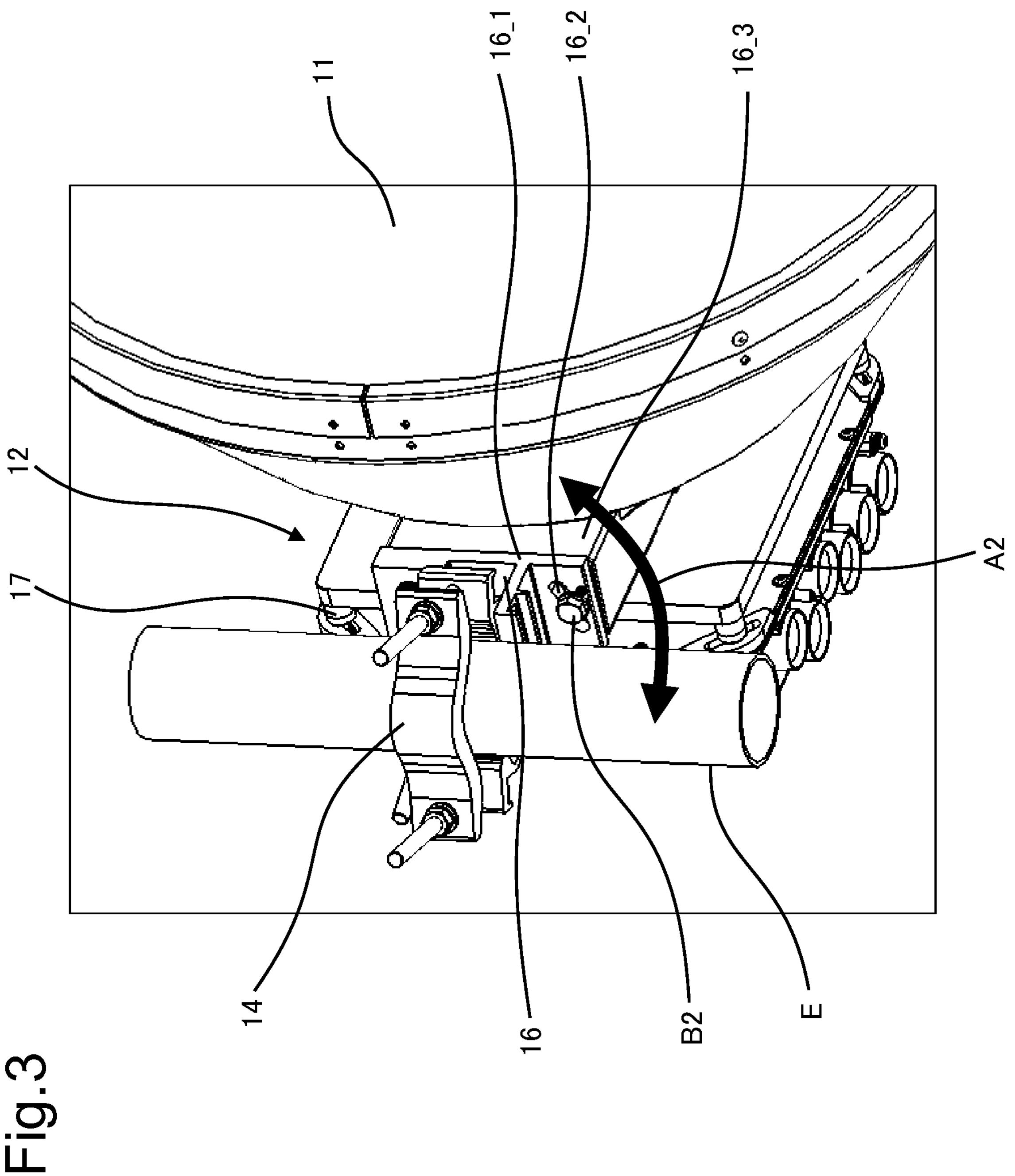
FIG. 3 is an enlarged oblique view of the part including the attachment member in the wireless communication unit according to the first example embodiment, and is an oblique view illustrating an example of a rotation direction relative to an elevation/depression angle direction.
Figure 4:
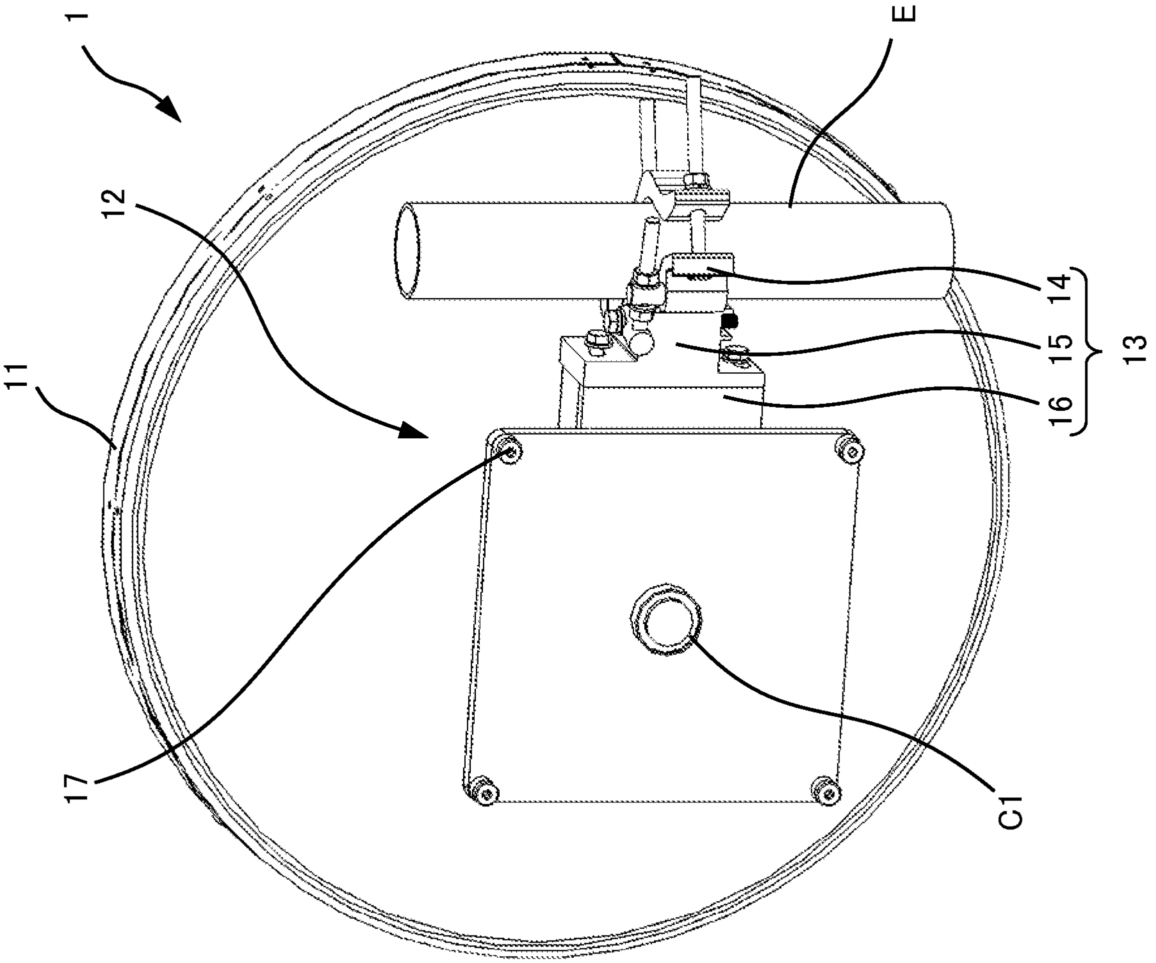
FIG. 4 is an oblique view of an antenna device in the wireless communication unit according to the first example embodiment, and is an oblique view including a connector of the antenna device.
Figure 5:
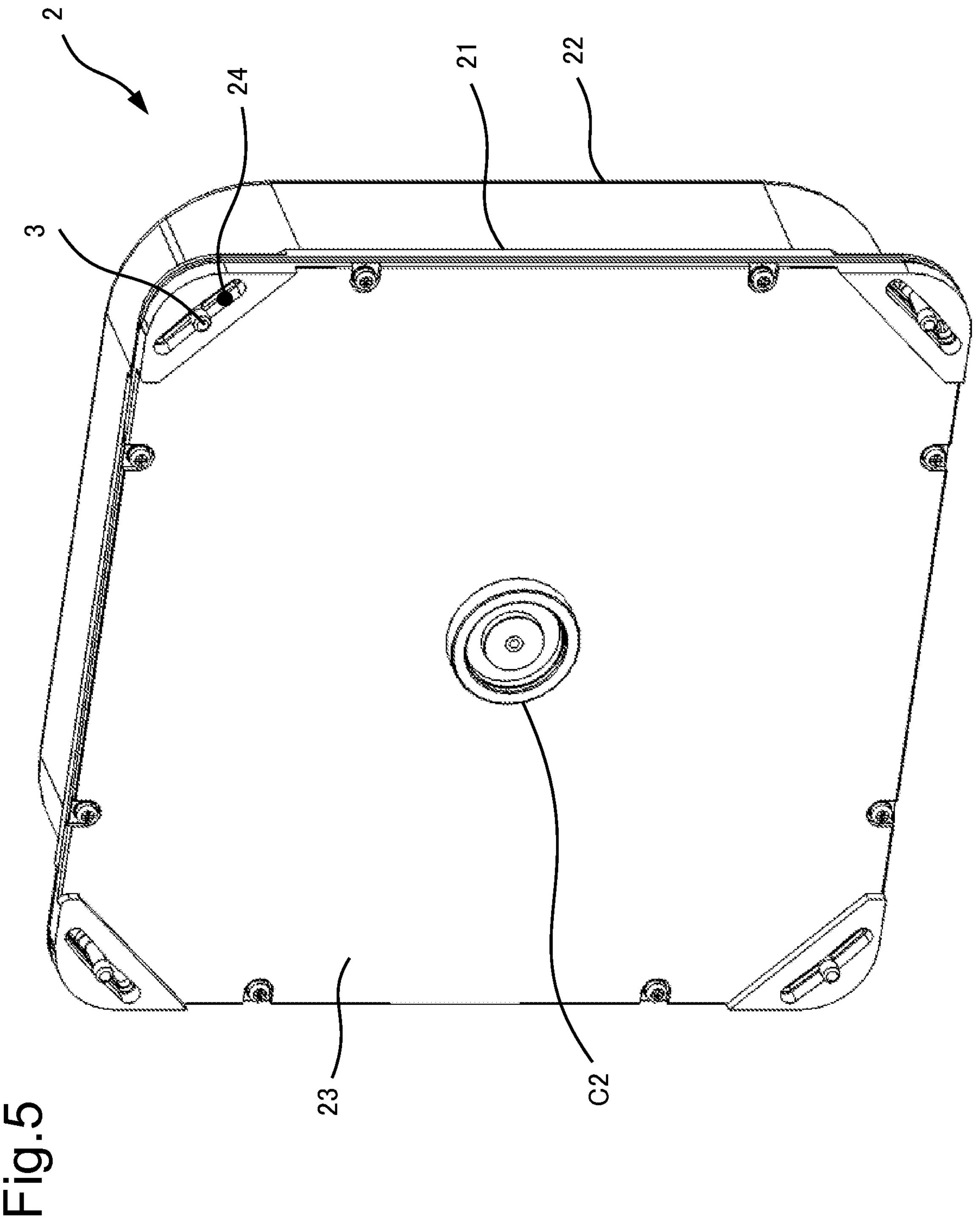
FIG. 5 is an oblique view of a wireless communication device in the wireless communication unit according to the first example embodiment, and is an oblique view including a connector of the wireless communication device.
Figure 6:
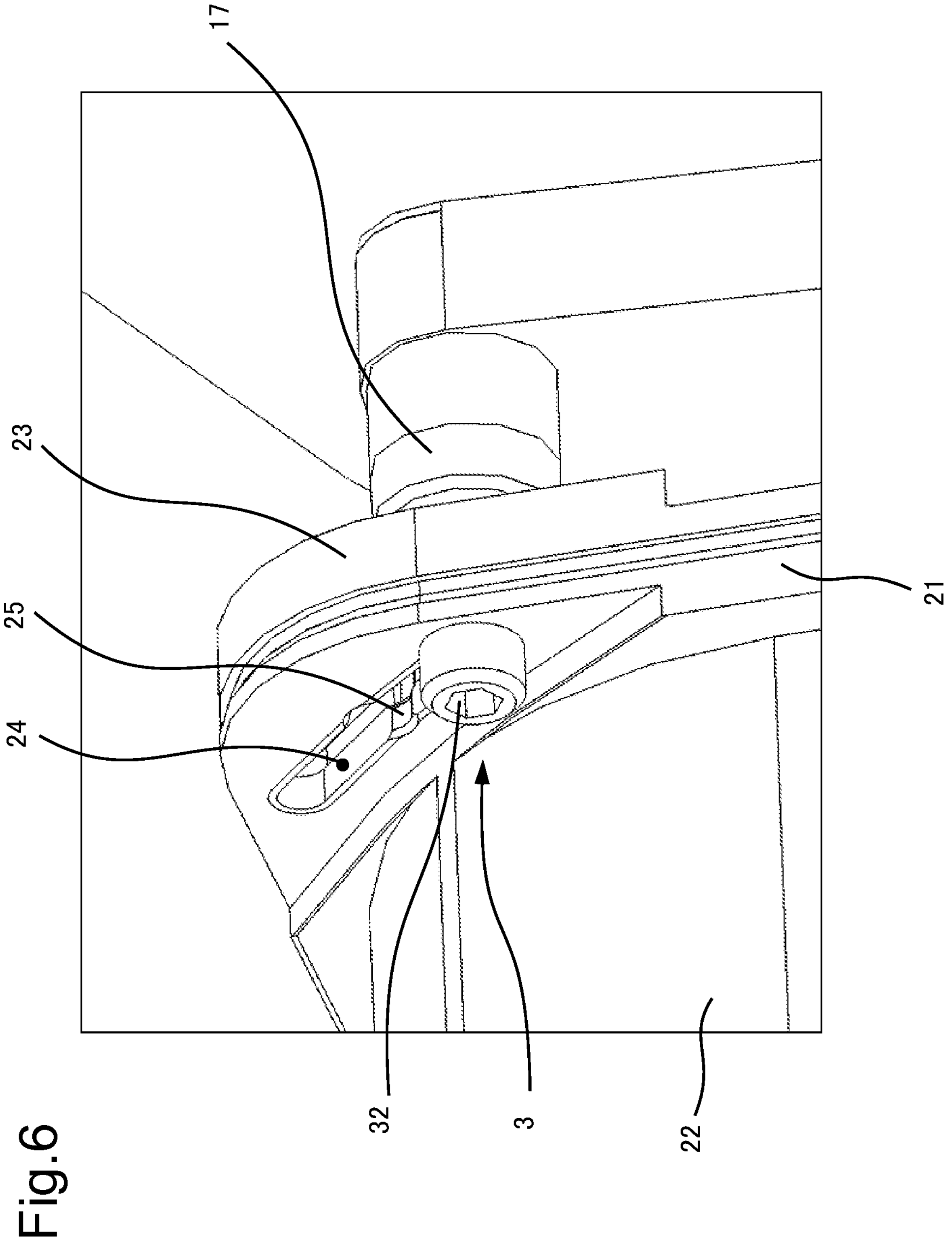
FIG. 6 is an enlarged oblique view of a part including a guide part and a screw member in the wireless communication unit according to the first example embodiment.
Figure 7:
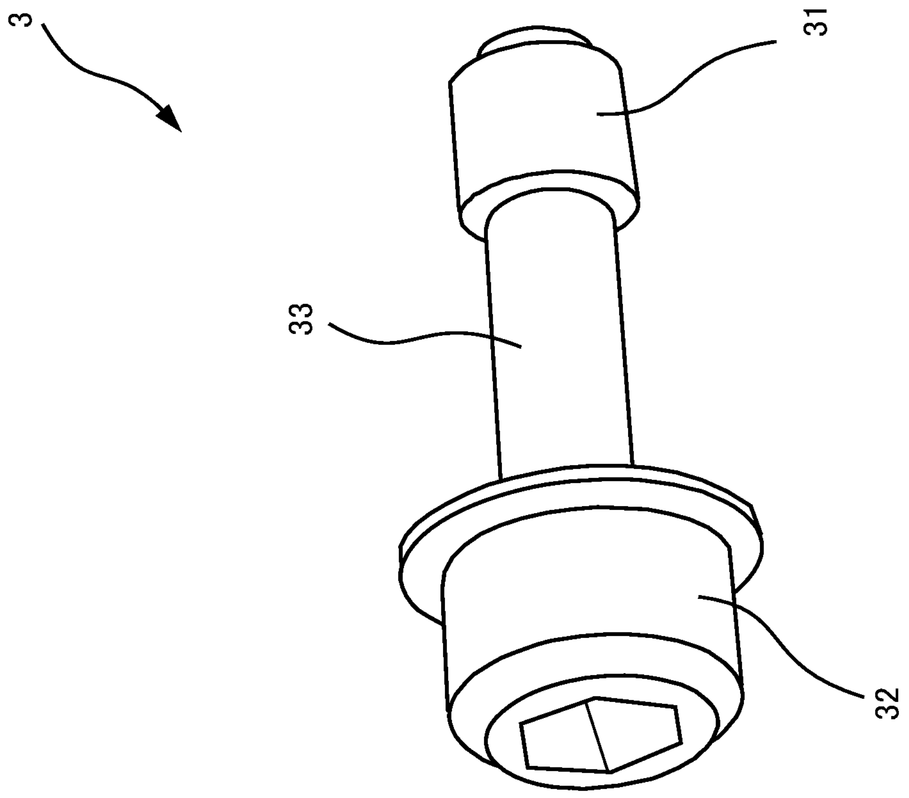
FIG. 7 is an oblique view illustrating the screw member in the wireless communication unit according to the first example embodiment.
Figure 8:
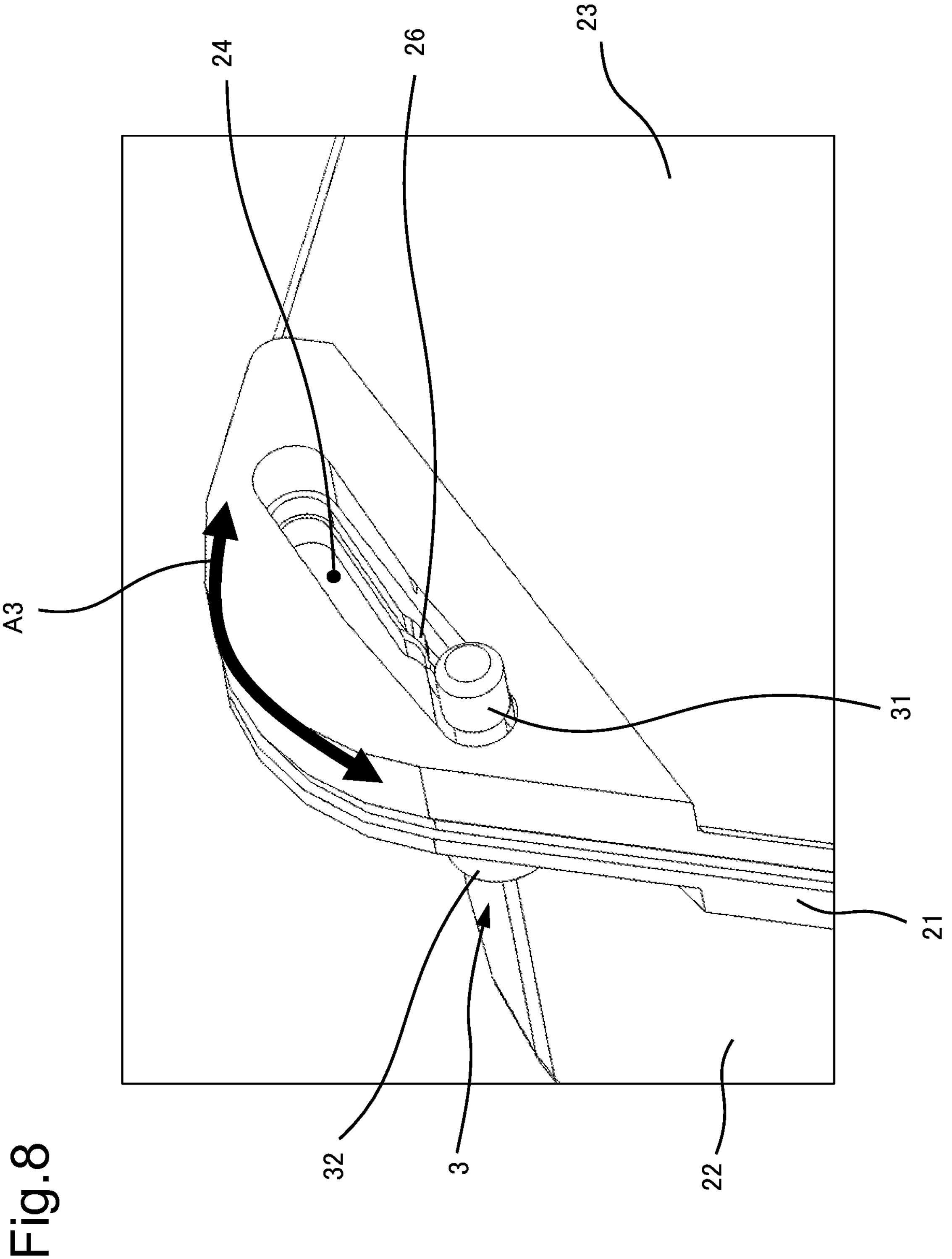
FIG. 8 is an oblique view illustrating a state in which the screw member in the wireless communication unit according to the first example embodiment penetrates through the guide part, and is an oblique view illustrating an example of a rotation direction relative to a polarization angle direction.
Figure 9A:
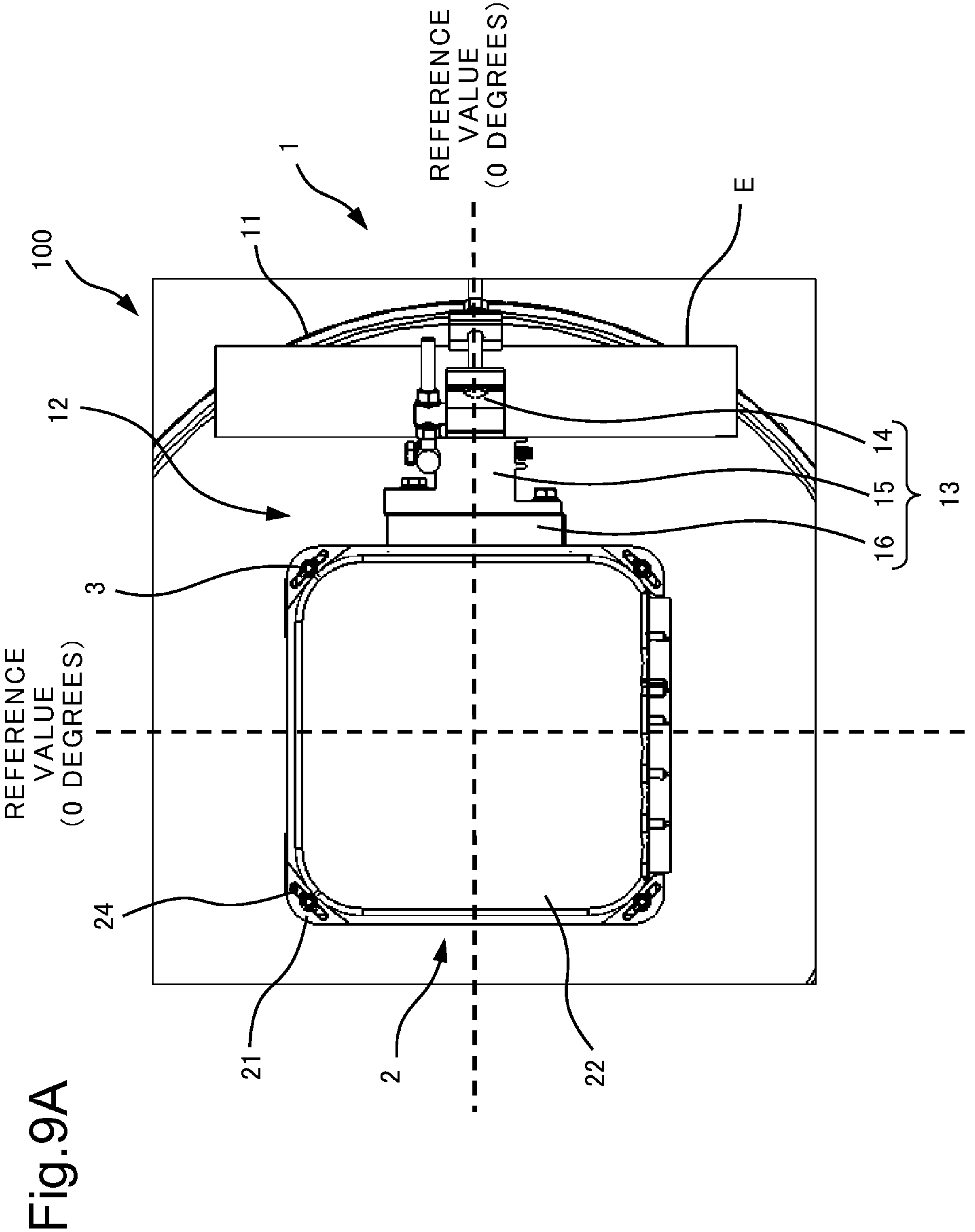
FIG. 9A is a back view illustrating a main part of the wireless communication unit according to the first example embodiment, and is a back view illustrating an example of a state in which a polarization angle is set to 0 degrees.
Figure 9B:
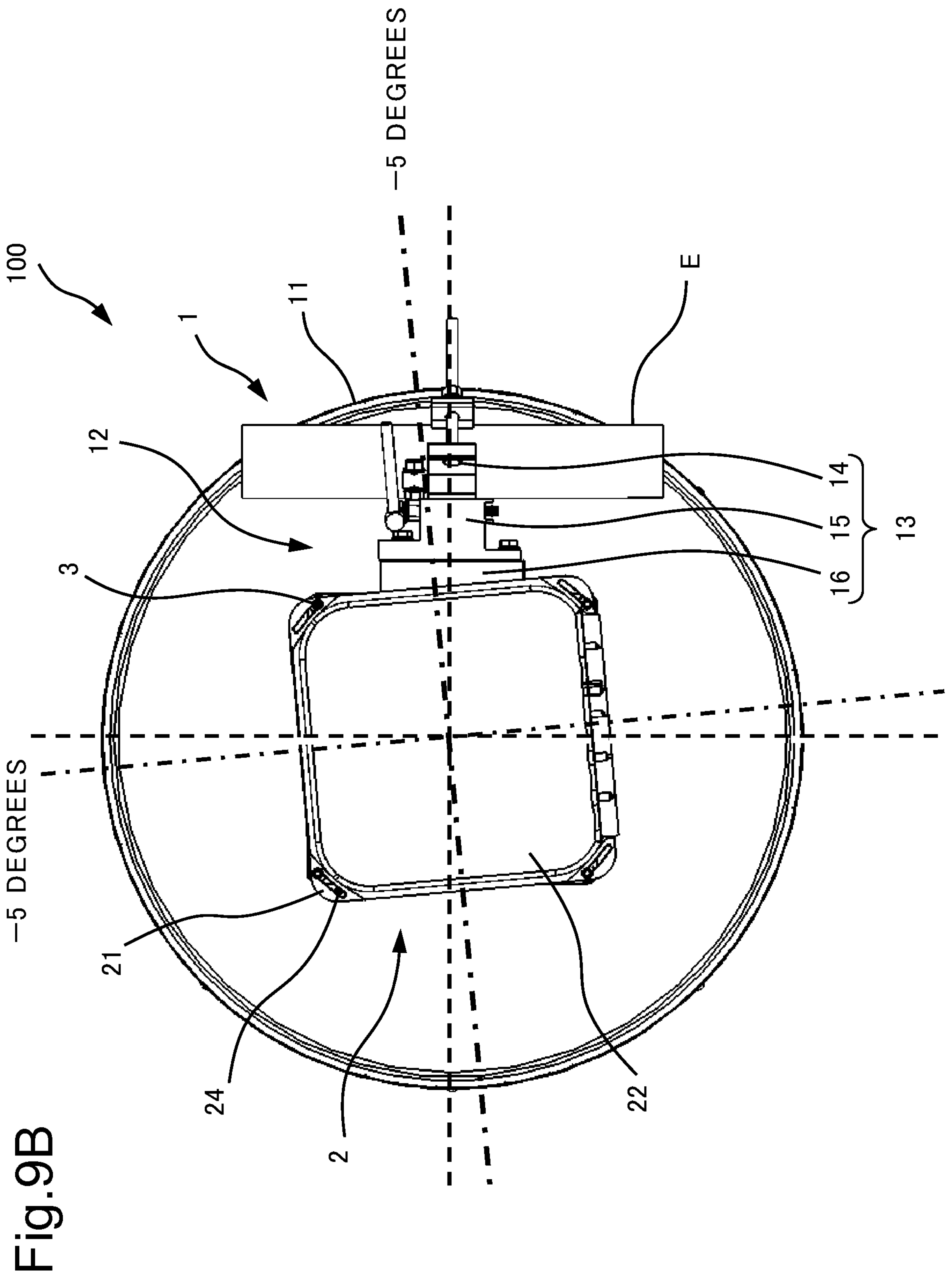
FIG. 9B is a back view illustrating the main part of the wireless communication unit according to the first example embodiment, and is a back view illustrating an example of a state in which the polarization angle is set to −5 degrees.
Figure 9C:
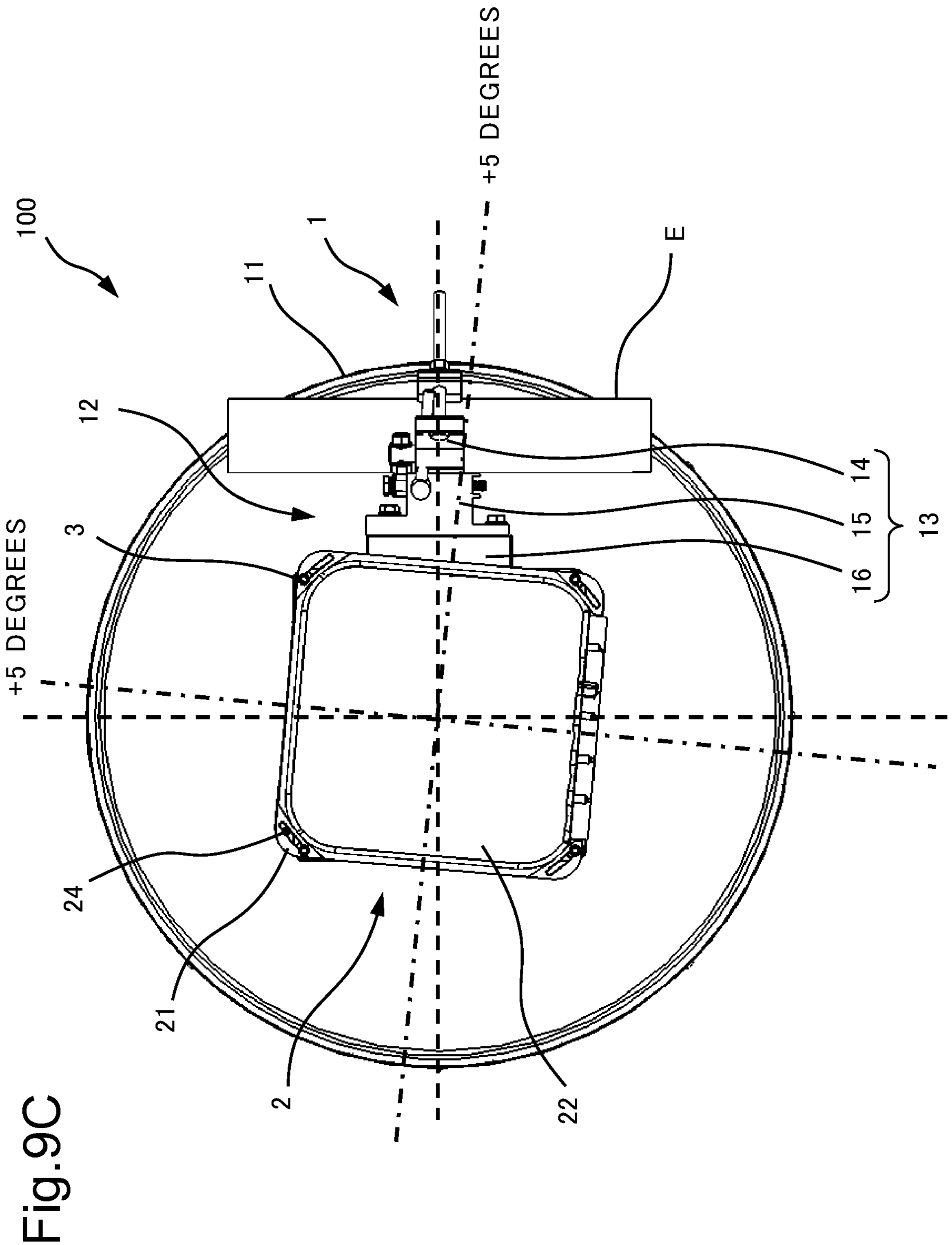
FIG. 9C is a back view illustrating the main part of the wireless communication unit according to the first example embodiment, and is a back view illustrating an example of a state in which the polarization angle is set to +5 degrees.

FIG. 1 is an oblique view illustrating a main part of a wireless communication unit according to the first example embodiment. FIG. 2 is an enlarged oblique view of a part including an attachment member in the wireless communication unit according to the first example embodiment, and is an oblique view illustrating an example of a rotation direction relative to an azimuthal angle direction. FIG. 3 is an enlarged oblique view of the part including the attachment member in the wireless communication unit according to the first example embodiment, and is an oblique view illustrating an example of a state in which a rotation direction relative to an elevation/depression angle. FIG. 4 is an oblique view of an antenna device in the wireless communication unit according to the first example embodiment, and is an oblique view including a connector of the antenna device. FIG. 5 is an oblique view of a wireless communication device in the wireless communication unit according to the first example embodiment, and is an oblique view including a connector of the wireless communication device. FIG. 6 is an enlarged oblique view of a part including a guide part and a screw member in the wireless communication unit according to the first example embodiment. FIG. 7 is an oblique view illustrating a screw member in the wireless communication unit according to the first example embodiment. FIG. 8 is an oblique view illustrating a state in which the screw member in the wireless communication unit according to the first example embodiment penetrates through the guide part, and is an oblique view illustrating an example of a rotation direction relative to a polarization angle direction. FIG. 9A is aback view illustrating a main part of the wireless communication unit according to the first example embodiment, and is a back view illustrating an example of a state in which a polarization angle is set to 0 degrees. FIG. 9B is a back view illustrating the main part of the wireless communication unit according to the first example embodiment, and is a back view illustrating an example of a state in which the polarization angle is set to −5 degrees. FIG. 9C is a back view illustrating the main part of the wireless communication unit according to the first example embodiment, and is a back view illustrating an example of a state in which the polarization angle is set to +5 degrees. The wireless communication unit according to the first example embodiment will be described with reference to FIGS. 1 to 8 and FIGS. 9A to 9C.

A wireless communication unit 100 performs point-to-point wireless communication to the opposite station in a state in which the wireless communication unit 100 is located opposite to unillustrated another wireless communication unit (hereinafter, referred to as an "opposite station"). For example, a radio wave in an 80 GHz band (so-called "E-band") is used for the wireless communication. A wireless communication device 2 of the wireless communication unit 100 supports wireless communication based on polarization-multiplexing using vertical polarization and horizontal polarization. In other words, the wireless communication device 2 has a cross polarization interference canceller (XPIC) function.

As illustrated in FIG. 1, the wireless communication unit 100 includes an antenna device 1. The antenna device 1 includes an antenna body 11 and an attachment member 12.

The antenna body 11 is, for example, constituted of an antenna supporting point-to-point wireless communication using a radio wave in the E-band. The antenna body 11 is constituted of an antenna supporting wireless communication based on polarization multiplexing using vertical polarization and horizontal polarization. The antenna body 11 may be constituted of an antenna supporting both the wireless communication based on polarization multiplexing and wireless communication based on single polarization using vertical polarization or horizontal polarization. In the example illustrated in FIG. 1 and the like, the antenna body 11 is constituted of a circular planar antenna.

The attachment member 12 is, for example, constituted of a dedicated metal fixture. The attachment member 12 is fixed to a back surface of the antenna body 11. The attachment member 12 includes an arm unit 13 extending toward a side of the antenna device 1. At a tip of the arm unit 13, a structure (hereinafter, sometimes referred to as a "holding structure") 14 holding a member of a predetermined shape (for example, columnar, cylindrical, or tabular) in a pinching or grasping manner is installed. In examples illustrated in FIG. 1 and the like, the holding structure 14 holds a columnar or cylindrical member in a pinching manner.

By the holding structure 14 holding a member (hereinafter, referred to as an "to-be-attached member") E to which the antenna device 1 is attached, the antenna device 1 is attached to the to-be-attached member E. The to-be-attached member E is, for example, an integral part of an unillustrated building (such as a high-rise building or a steel tower), and is installed outside of the building.

As illustrated in FIGS. 1 and 2, the arm unit 13 is installed with a mechanism (hereinafter, sometimes referred to as a "first rotation mechanism") 15 that causes the antenna body 11 to rotate in an azimuthal angle direction relative to the to-be-attached member E in a state in which the antenna device 1 is attached to the to-be-attached member E. A bidirectional arrow A1 in FIG. 2 indicates a direction in which the first rotation mechanism rotates the antenna body 11.

In the example illustrated in FIG. 2, an abbreviated semi-cylindrical part (not illustrated) being a root part of the holding structure 14 is disposed inside an abbreviated box-shaped part 15_1. An axial center (not illustrated) of the abbreviated semi-cylindrical part is a rotation axis. An abbreviated cylindrical part 15_2 in parallel with the to-be-attached member E is installed in the holding structure 14. By fastening a bolt B1 penetrating through the abbreviated cylindrical part 15_2 (more specifically, by fastening a pair of nuts being put through the bolt B1 and disposed in such a way as to clamp the abbreviated cylindrical part 15_2), a relative position of the abbreviated cylindrical part 15_2 relative to the abbreviated box-shaped part 15_1 is fixed. Rotation of the root part of the holding structure 14 relative to the abbreviated box-shaped part 15_1 is limited. Meanwhile, by loosening the bolt B1 (more specifically, by loosening the above-described pair of nuts), the position of the abbreviated cylindrical part 15_2 relative to the abbreviated box-shaped part 15_1 becomes variable in a predetermined range. The root part of the holding structure 14 becomes freely rotatable relative to the abbreviated box-shaped part 15_1 in a predetermined range.

In other words, in the example illustrated in FIG. 2, fastening the bolt B1 results in a state in which rotation of the first rotation mechanism is limited. Meanwhile, loosening the bolt B1 results in a state in which the first rotation mechanism 15 is freely rotatable. For example, a range of rotation of the antenna body 11 by the first rotation mechanism is set to an angle range of ±15 degrees with the state illustrated in FIGS. 1 and 2 as a reference value (0 degrees). By loosening another pair of nuts 14_1 and 14_2 in the holding structure 14, an attachment height of the antenna device 1 relative to the to-be-attached member E can also be adjusted.

As illustrated in FIGS. 1 and 3, in the arm unit 13, a mechanism (hereinafter, sometimes referred to as a "second rotation mechanism") 16 is installed that causes the antenna body 11 to rotate in an elevation/depression angle direction relative to the to-be-attached member E in a state in which the antenna device 1 is attached to an to-be-attached member E. A bidirectional arrow A2 in FIG. 3 indicates a direction of rotation of the antenna body 11 by the second rotation mechanism 16.

In the example illustrated in FIG. 3, an arc-shaped hole 16_2 is formed in an abbreviated tabular part 16_1 being a root part of the first rotation mechanism 15, and a bolt B2 is threaded through the arc-shaped hole 16_2. A male screw part (not illustrated) of the bolt B2 is screwed to a female screw part (not illustrated) of an abbreviated box-shaped part 16_3 being a root part of the arm unit 13. By loosening the bolt B2, the abbreviated tabular part 16_1 becomes freely rotatable relative to the abbreviated box-shaped part 16_3 in a predetermined range. Meanwhile, by fastening the bolt B2, rotation of the abbreviated tabular part 16_1 relative to the abbreviated box-shaped part 16_3 is limited. Note that, since a rotation axis of the rotation (a rotation axis of the abbreviated tabular part 16_1) is disposed inside the abbreviated box-shaped part 163, illustration thereof is omitted.

In example illustrated in FIG. 3, fastening the bolt B2 results in a state in which rotation of the second rotation mechanism 16 is limited. Meanwhile, loosening the bolt B2 results in a state in which the second rotation mechanism 16 is freely rotatable. For example, a range of rotation of the antenna body 11 by the second rotation mechanism 16 is set to an angle range of ±15 degrees with the state illustrated in FIGS. 1 and 3 as a reference value (0 degrees).

As illustrated in FIG. 1, the wireless communication device 2 is disposed on a back surface of the antenna device 1. In the wireless communication device 2, an unillustrated transmission circuit and an unillustrated reception circuit are accommodated inside a housing. In other words, the wireless communication device 2 includes the housing, and the transmission circuit and the reception circuit that are not illustrated. The housing of the wireless communication device 2 is constituted of an abbreviated box-shaped housing 22 including a flange part 21, and an abbreviated tabular housing cover 23 installed along an opening and a flange surface of the housing 22.

The antenna device 1 and the wireless communication device 2 are electrically connected to each other by connectors C1 and C2 function as waveguides. FIG. 4 illustrates the connector installed in the antenna device 1. Meanwhile, FIG. 5 illustrates an example of the connector C2 installed in the wireless communication device 2. As illustrated in FIG. 4, the connector C1 is abbreviated cylindrical in shape and is disposed on a central part of the antenna device 1. As illustrated in FIG. 5, the connector C2 is abbreviated cylindrical in shape and is disposed on a central part of the wireless communication device 2.

A radio wave of each polarization being output by the wireless communication device 2 is input to the antenna device 1 via the connectors C1 and C2. The radio wave being input is transmitted to the opposite station by the antenna device 1. Meanwhile, a radio wave of each polarization being output by the opposite station is received by the antenna device 1. The radio wave being received is input to the wireless communication device 2 via the connectors C1 and C2.

Herein, the wireless communication device 2 is fixed to the antenna device 1 in a manner described below.

A guide part is formed in the wireless communication device 2. Specifically, for example, as illustrated in FIG. 1 and the like, at four corner parts of the wireless communication device 2, arc-shaped holes 24 are formed through the flange part 21 and the housing cover 23. The holes 24 are arranged concentrically from a central axis (a central axis of the connectors C1 and C2) of the housing of the wireless communication device 2. The holes 24 constitute the guide part.

A screw member is used in fixing the wireless communication device 2. Specifically, for example, as illustrated in FIGS. 6 and 7, the bolt 3 is used in the screw member. A screw thread is formed on a tip part 31 of the bolt 3. In other words, in the bolt 3, no screw thread is formed on a neck part 33 being a part in between the tip part 31 and a head part 32. Therefore, a diameter of the neck part 33 is smaller than a diameter in the tip part 31 including the screw thread (an outer diameter of the tip part 31). A width of the hole 24 (a short-axial length of the hole 24) is set to a value according to the diameter of the neck part 33 (a value slightly larger than the diameter of the neck part 33).

As illustrated in FIG. 6, in the flange part 21, a female screw part 25 that fits the screw thread of the bolt 3 is formed in a central part of each of the holes 24. A female screw part 17 that fits the tip part 31 of the bolt 3 is formed on the back surface of antenna device 1 (more specifically, on a back surface of the attachment member 12). As illustrated in FIG. 8, in the housing cover 23, a widening part 26 according to the outer diameter of the tip part 31 is formed in the central part of each of the holes 24.

First, each of the tip parts 31 of the four bolts 3 is screwed from a back side of the wireless communication device 2 (specifically, from a side of the housing 22) to each of the female screw parts 25 of the four holes 24. In this state, each of the bolts 3 is turned clockwise. This results in a state in which the tip part 31 of each of the bolts 3 passes through the female screw part 25 and the widening part 26 and the neck part 33 of each of the bolts 3 penetrates through the hole 24. In this occasion, as described above, the width of the hole 24 is set to a value according to the diameter of the neck part 33. An outer diameter of the head part 32 of the bolt 3 and the outer diameter of the tip part 31 of the outer bolt 3 is larger than the diameter of the neck part 33 and the width of the hole 24. Thus, the bolt 3 is prevented from falling off from the wireless communication device 2.

Next, each of the tip parts 31 of the four bolts 3 is screwed to each of the four female screw parts 17. In this state, by fastening each of the bolts 3 (specifically, by further turning each of the bolts 3 clockwise), the wireless communication device 2 is fixed to the antenna device 1. Meanwhile, in a state in which each of the bolts 3 is loosened relative to the female screw part 17, as illustrated in FIG. 8, the wireless communication device 2 is freely rotatable in a polarization angle direction in such a way that the neck part 33 of each of the bolts 3 slides against an inner wall of the hole 24. In other words, the wireless communication device 2 is freely rotatable in the polarization angle direction in such a way that each of the screw members is guided by the guide part.

A bidirectional arrow A3 in FIG. 8 indicates a direction of rotation of the wireless communication device 2 relative to the antenna device 1. By the wireless communication device 2 rotating in the direction, a polarization angle of the wireless communication device 2 (specifically, a tilt angle of each polarization of the radio wave transmitted or received by the wireless communication unit 100) is changed. For example, a range of the rotation is set to an angle range of ±5 degrees with a state in which each bolt 3 is disposed in a central part of the hole 24 as a reference value (0 degrees).

FIG. 9A illustrates a state in which the polarization angle is set to a reference value (0 degrees). Meanwhile, FIG. 9B illustrates a state in which the polarization angle is changed by −5 degrees (5 degrees counterclockwise on paper) relative to the reference value, due to rotation of the wireless communication device 2. Meanwhile, FIG. 9C illustrates a state in which the polarization angle is changed by +5 degrees (5 degrees clockwise on paper) relative to the reference value, due to rotation of the wireless communication device 2.

In this way, the main part of the wireless communication unit 100 is constituted.

Next, an adjustment method of an azimuthal angle, an elevation/depression angle, and a polarization angle of the wireless communication unit 100 is described.

The wireless communication device 2 is preliminarily fixed to the antenna device 1 by using the bolt 3. The antenna device 1 is preliminarily attached to the to-be-attached member E by the attachment member 12. An unillustrated opposite station is preliminarily installed.

As a first process, an unillustrated worker adjusts an azimuthal angle and an elevation/depression angle of the antenna device 1.

Specifically, the worker loosens the bolt B1 in the attachment member 12. Thereby, the first rotation mechanism 15 becomes freely rotatable. In other words, the antenna body 11 becomes freely rotatable in an azimuthal angle direction relative to the to-be-attached member E. In this state, the worker rotates the antenna body 11 in the azimuthal angle direction while monitoring reception revel of a radio wave by the wireless communication device 2. The worker fastens the bolt B1 at an angular position where the reception level increases (specifically, in a state in which adjustment of the azimuthal angle is finished). This results in a state in which rotation of the first rotation mechanism 15 is limited. In this way, the azimuthal angle antenna device 1 is adjusted within a range of ±15 degrees.

The worker loosens the bolt B2 in the attachment member 12. Thereby, the second rotation mechanism 16 becomes freely rotatable. In other words, the antenna body 11 becomes freely rotatable in an elevation/depression angle direction relative to the to-be-attached member E. In this state, the worker rotates the antenna body 11 in the elevation/depression angle direction while monitoring reception level of the radio wave by the wireless communication device 2. The worker fastens the bolt B2 at an angular position where the reception level increases (specifically, in a state in which adjustment of the elevation/depression angle is finished). This results in a state in which rotation of the second rotation mechanism 16 is limited. In this way, the elevation/depression angle of the antenna device 1 is adjusted within a range of ±15 degrees.

As a second process, the worker adjusts a polarization angle of the wireless communication device 2.

Specifically, the worker loosens each of the bolts 3. Thereby the wireless communication device 2 becomes freely rotatable in a polarization angle relative to the antenna device 1. The worker rotates the wireless communication device 2 in the polarization angle direction while monitoring a characteristic of wireless communication by the wireless communication unit 100. More specifically, the worker rotates the wireless communication device 2 in the polarization angle direction while monitoring a cross polarization discrimination (XPD) characteristic. The worker fastens each of the bolts 3 at an angular position where the characteristic improves (specifically, in a state where adjustment of the polarization angle is finished). This results in a state in which rotation of the wireless communication device 2 relative to the antenna device 1 is limited. In other words, wireless communication device 2 is fixed to the antenna device 1. In this way, the polarization angle of the wireless communication device 2 is fine-adjusted in a range of ±5 degrees.

Next, an advantageous effect of using the wireless communication unit 100 is described.

First, as described above, by using the wireless communication unit 100, the polarization angle can be adjusted in addition to the azimuthal angle and elevation/depression angle. Specifically, for example, the polarization angle can be fine-adjusted within the range of ±5 degrees, after the azimuthal angle and the elevation/depression angle is adjusted within the range of ±15 degrees. By the adjustment of the polarization angle, XPD can be improved. In particular, generally, in wireless communication based on polarization-multiplexing using vertical polarization and horizontal polarization, XPD is usually lower than that in wireless communication based on single polarization using vertical polarization or horizontal polarization. Therefore, it is suitable to improve the XPD by adjusting the polarization angle.

Second, in the wireless communication unit 100, a structure for adjusting the polarization angle is achieved by the structure (including the guide part and the screw member) for fixing the wireless communication device 2 to the antenna device 1. In other words, the structure for fixing the wireless communication device 2 to the antenna device 1 is achieved by the structure for adjusting the polarization angle. Thus, the number of components can be reduced compared to a case in which these structures are installed separately from each other. Consequently, a structure of the wireless communication unit 100 can be simplified.

Third, in the wireless communication unit 100, the mechanism for adjusting the azimuthal angle (the first rotation mechanism 15), the mechanism for adjusting the elevation/depression angle (the second rotation mechanism 16) and the structure (including the guide part and the screw member) for adjusting the polarization angle are collectively disposed on the back surface of the antenna device 1. Thereby, a work of adjusting these angles can be made easier compared to a case in which these mechanisms and structure are disposed in a distributed manner. In particular, when the to-be-attached member E is installed at a high place (for example, a high-rise building or a steel tower), a work time at the high place can be reduced because the work of adjusting the angles is easy.

Next, an advantageous effect of the wireless communication unit 100 in comparison with the technique described in PTL 1 is described.

As described above, the portable antenna device described in PTL 1 includes the tripod, the rotation mechanism, the control device, the expanding mechanism, the planar antenna, and transmission/reception device. In order to achieve adjustment of an azimuthal angle, the rotation mechanism installed between the tripod and the control device is used. In order to achieve adjustment of a polarization angle, the polarization angle adjustment mechanism installed between the planar antenna and the expanding mechanism is used. In order to achieve adjustment of an elevation angle, the elevation angle adjustment member installed between the polarization angle adjustment mechanism and the expanding mechanism is used. Thus, there is a problem that it is difficult to simplify a structure of the portable antenna device because a large number of components are required for achieving angle adjustment.

Meanwhile, the wireless communication unit 100 includes the antenna body 11, the attachment member 12, the wireless communication device 2, and the screw member (more specifically, the bolt 3). The mechanism for adjusting an azimuthal angle (the first rotation mechanism 15) and the mechanism for adjusting an elevation/depression angle (the second rotation mechanism 16) are both installed in the attachment member 12. The structure for adjusting a polarization angle is achieved by the structure (including the guide part and the screw member) for fixing the wireless communication device 2 to the antenna device 1.

Thus, in the wireless communication unit 100, adjustment of an azimuthal angle, an elevation/depression angle, and a polarization angle can be achieved, and the number of components required for achieving adjustment of these angles can be reduced compared to the portable antenna device described in PTL 1. Therefore, the structure can be simplified.

In the portable antenna device described in PTL 1, the rotation mechanism is installed on the bottom surface of the control device, and the polarization angle adjustment mechanism and the elevation angle adjustment member are installed on a back surface of the planar antenna. In other words, the mechanism for adjusting an azimuthal angle (the rotation mechanism), the mechanism for adjusting a polarization angle (the polarization angle adjustment mechanism), and the member for adjusting an elevation angle (the elevation angle adjustment member) are disposed in a distributed manner. Therefore, there is a problem that, a large amount of movement and posture change by a worker is required when adjusting an azimuthal angle, an elevation angle, and polarization angle.

Meanwhile, in the wireless communication unit 100, the attachment member 12 including the first rotation mechanism 15 and the second rotation mechanism 16 is installed on the back surface of the antenna body 11. On the back surface of the antenna device 1, the structure for adjusting a polarization angle is achieved by the structure for fixing the wireless communication device 2. Thus, as described above, a mechanism for adjusting an azimuthal angle, a mechanism for adjusting an elevation/depression angle, and a mechanism for adjusting a polarization angle are collectively disposed on the back surface of the antenna device 1. Therefore, an amount of movement and posture change by a worker when adjusting these angles, can be reduced compared to the portable antenna device described in PTL 1. In other words, a work for adjusting these angles can be made easier.

Figure 10:
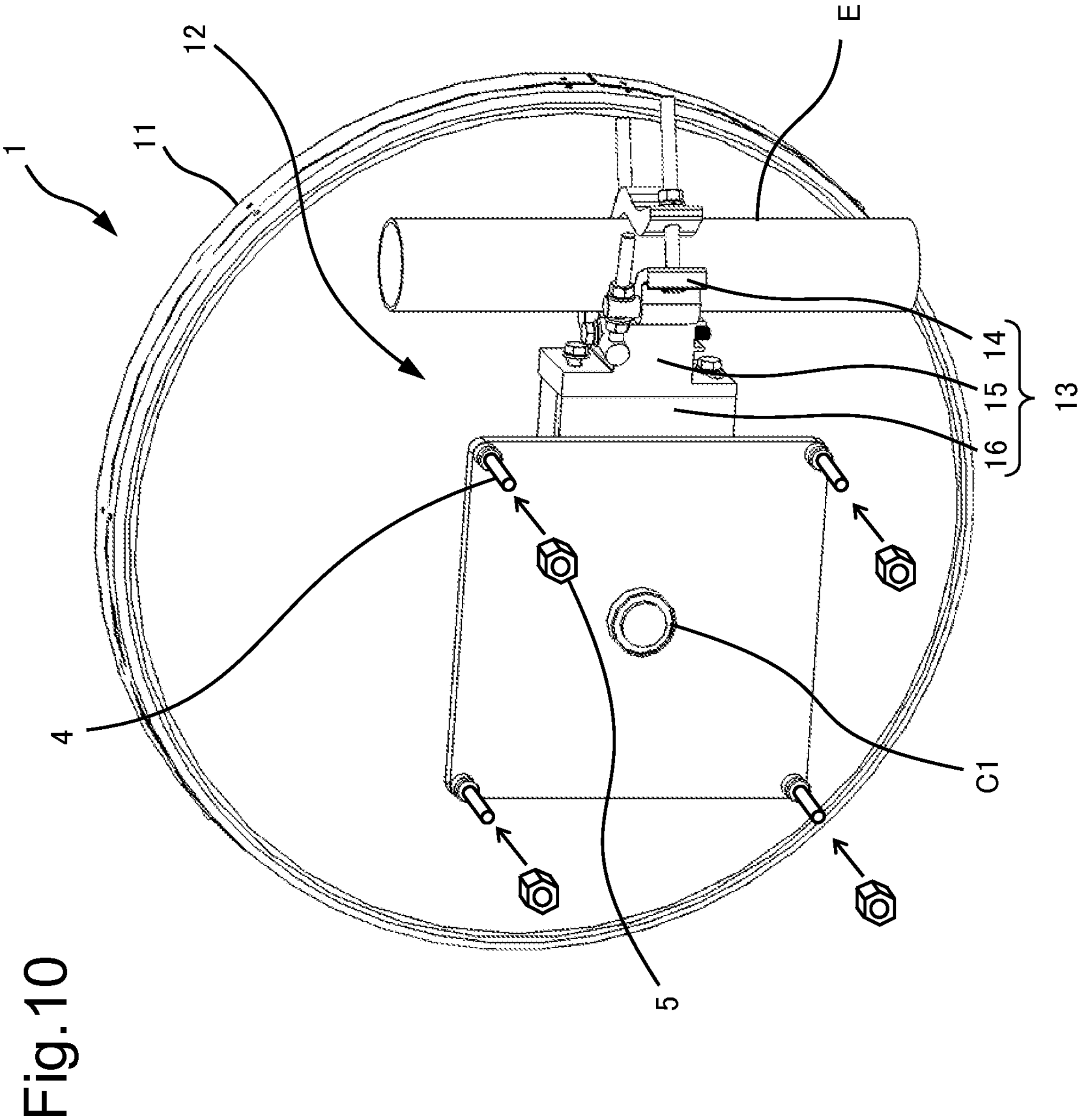
FIG. 10 is an oblique view of an antenna device in the wireless communication unit according to the first example embodiment, and is an oblique view including another screw member.

Next, a modification example of the wireless communication unit 100 is described with reference to FIG. 10.

The screw member is not limited to the bolt 3. For example, as illustrated in FIG. 10, a bolt-shaped member 4 may be fixed to the back surface of the antenna device 1 instead of the female screw part 17 formed therein. The screw member may be constituted of the bolt-shaped member 4 and a nut-shaped member 5 screwed to a male screw part of the bolt-shaped member 4. In this case, a width of the hole 24 is set to a value according to an outer diameter of the male screw part of the bolt-shaped member 4. In this case, the female screw part 25 and the widening part 26 are not necessary in the hole 24.

In this case, the wireless communication device 2 is fixed to the antenna device 1 in the following manner. First, the wireless communication device 2 is disposed on the back surface of the antenna device 1 by threading the male screw part of the bolt-shaped member 4 through each of the holes 24. Next, the nut-shaped member 5 is screwed onto a tip part of the male screw part of each of the bolt-shaped members 4 from the back side of the wireless communication device 2 (specifically, from a housing 22 side). In this state, by fastening the nut-shaped member 5 in this state, the wireless communication device 2 is fixed to the antenna device 1. Loosening the nut-shaped member 5 results in a state in which the wireless communication device 2 is freely rotatable relative to the antenna device 1.

Figure 11:
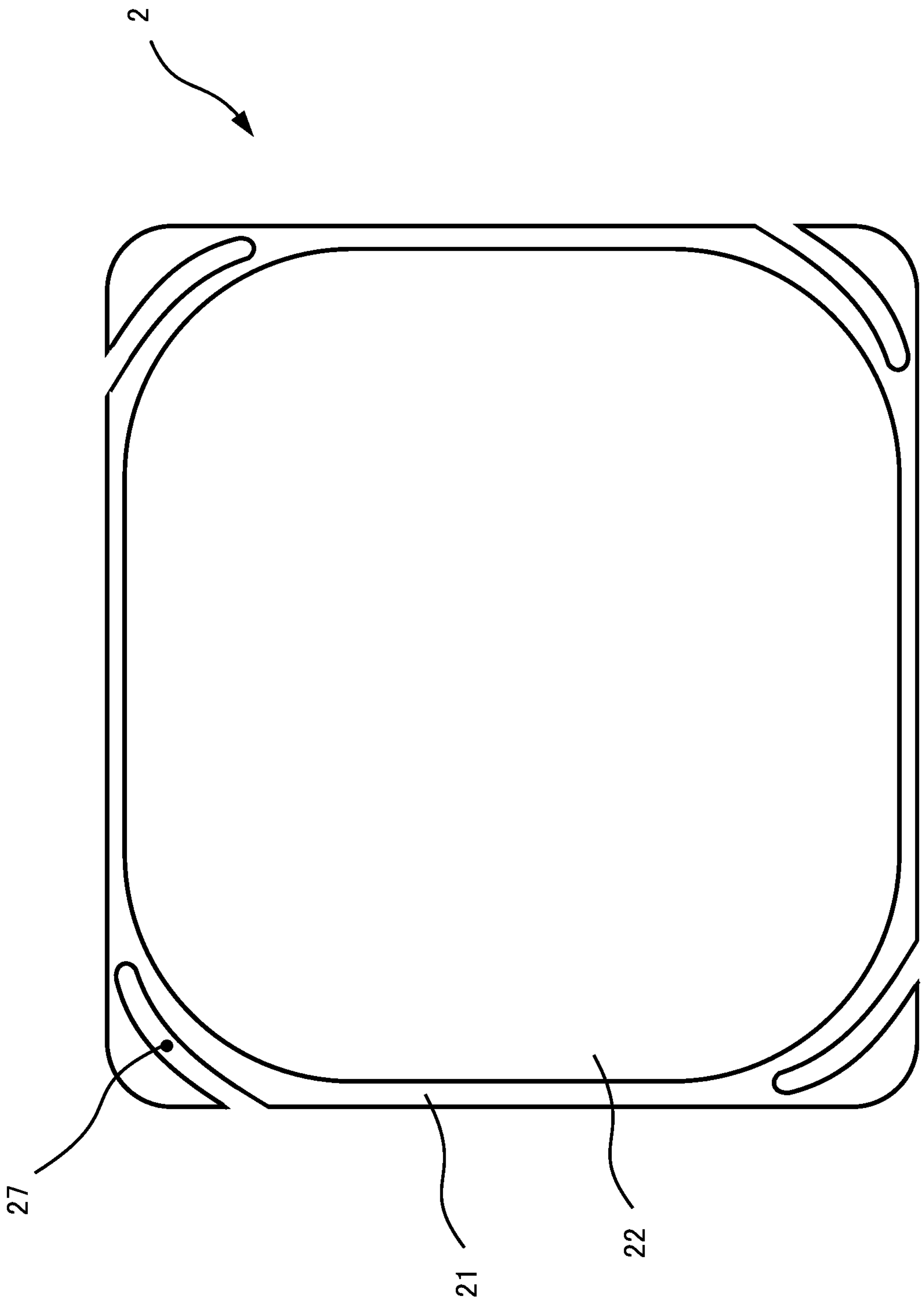
FIG. 11 is a back view of the wireless communication device in the wireless communication unit according to the first example embodiment, and is a back view including another guide part.

Next, another modification example of the wireless communication unit 100 will be described with reference to FIG. 11.

The guide part is not limited to the arc-shaped holes 24. For example, as illustrated in FIG. 11, the guide part may be constituted of notched slots 27 having a shape of the arc-shaped hole 24 opening at one end. In other words, the guide part may be constituted of the arc-shaped slots 27. In this case, the female screw part 25 and the widening part 26 are unnecessary in each of the slots 27.

In this case, wireless communication device 2 is fixed to the antenna device 1 in the following manner.

First, the tip part 31 of each of the bolts 3 is screwed to the female screw part 17. In this state, the wireless communication device 2 is attached to the back surface of the antenna device 1 while the wireless communication device 2 is rotated in such a way that the neck part 33 of the bolt 3 enters each of the slots 27 from an opening at one end of the slot 27. By fastening the bolt 3 in a state in which the wireless communication device 2 is attached, the wireless communication device 2 is fixed to the antenna device 1. Loosening the bolt 3 results in a state in which the wireless communication device 2 is freely rotatable relative to the antenna device 1.

Next, another modification example of the wireless communication unit 100 will be described.

Instead of performing point-to-point wireless communication using the radio wave in the E-band, the wireless communication unit 100 may perform point-to-point wireless communication using a radio wave in another frequency band. In other words, the antenna device 1 and the wireless communication device 2 may support transmission and reception of the radio wave in the another frequency band.

The wireless communication unit 100 may perform wireless communication based on single polarization using vertical polarization or horizontal polarization, instead of performing wireless communication based on polarization multiplexing using vertical polarization and horizontal polarization. In other words, the wireless communication device 2 may be a device supporting the wireless communication based on the single polarization, instead of being a device supporting the wireless communication based on the polarization multiplexing. In this case, a polarization angle in the single polarization is adjusted by the wireless communication device 2 rotating relative to the antenna device 1.

A shape of the antenna body 11 is only required to be appropriate for the wireless communication by the wireless communication unit 100. Therefore, antenna body 11 is not limited to the circular planar antenna. For example, a quadrangle planar antenna may be used in the antenna body 11.

The female screw part 17 may be formed on the back surface of the antenna body 11, instead of being formed in attachment member 12. In other words, the attachment member 12 may not include the female screw part 17. The same applies to the bolt-shaped member 4. In other words, a shape of the attachment member 12 is not limited to the specific examples illustrated in FIGS. 1 to 10. The attachment member 12 may only include at least a mechanism for adjusting an azimuthal angle and an elevation/depression angle and a structure for holding the to-be-attached member E.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

A part or the entirety of the above-described example embodiment may be described as the following supplementary notes, but is not limited thereto.

Supplementary Notes

[Supplementary Note 1]

A wireless communication unit including:

an antenna device including an antenna body and an attachment member including a mechanism for adjusting an azimuthal angle and an elevation/depression angle of the antenna body and a structure for holding a to-be-attached member;

a wireless communication device being disposed on a back surface of the antenna device;

an arc-shaped guide part formed in the wireless communication device; and a screw member that penetrates through the guide part and fixes the wireless communication device to the antenna device, wherein the wireless communication device rotates relative to the antenna device while the screw member is guided by the guide part in a state in which the screw member is loosened.

[Supplementary Note 2]

The wireless communication unit according to supplementary note 1, wherein a polarization angle of the wireless communication device is adjusted by the wireless communication device rotating relative to the antenna device.

[Supplementary Note 3]

The wireless communication unit according to supplementary note 1 or 2, wherein the attachment member is installed on a back surface of the antenna body.

[Supplementary Note 4]

The wireless communication unit according to any one of supplementary notes 1 to 3, wherein the screw member is a bolt, a screw thread is formed on a tip part of the bolt, and, in a state in which a neck part of the bolt penetrates through the guide part, a tip part of the bolt is screwed to a female screw part formed in the antenna device.

[Supplementary Note 5]

The wireless communication unit according to any one of supplementary notes 1 to 4, wherein the guide part is an arc-shaped hole or an arc-shaped slot.

[Supplementary Note 6]

The wireless communication unit according to any one of supplementary notes 1 to 5, wherein the attachment member includes an arm unit extending toward a side of the antenna device, the mechanism and the structure are installed in the arm unit.

[Supplementary Note 7]

The wireless communication unit according to supplementary notes 1 to 6, wherein the wireless communication device is for wireless communication based on polarization multiplexing using vertical polarization and horizontal polarization.

[Supplementary Note 8]

An angle adjustment method including:

adjusting an azimuthal angle and an elevation/depression angle of an antenna body of an antenna device by using a mechanism included in an attachment member of the antenna device;

loosening a screw member that penetrates through an arc-shaped guide part formed in a wireless communication device disposed on a back surface of the antenna device and fixes the wireless communication device to the antenna device;

adjusting a polarization angle of the wireless communication device by rotating the wireless communication device relative to the antenna device while the screw member is guided by the guide part in a state in which the screw member is loosened; and fixing the wireless communication device to the antenna device by fastening the screw member in a state in which adjustment of the polarization angle is finished.

This application is based upon and claims the benefit of priority from Japanese patent application No. 2021-044792, filed on Mar. 18, 2021, the disclosure of which is incorporated herein in its entirety by reference.

REFERENCE SIGNS LIST

1 Antenna device
2 Wireless communication device
3 Bolt
4 Bolt-shaped member
5 Nut-shaped member
11 Antenna body
12 Attachment member
13 Arm unit
14 Holding structure
15 First rotation mechanism
16 Second rotation mechanism
17 Female screw part
21 Flange part
22 Housing
23 Housing cover
24 Arc-shaped hole
25 Female screw part
26 Widening part
27 Arc-shaped slot
31 Tip part
32 Head part
33 Neck part
100 Wireless communication unit

What is claimed is:

1. A wireless communication unit comprising:

an antenna device including an antenna body, and an attachment member including a mechanism that adjusts an azimuthal angle and an elevation/depression angle of the antenna body and a structure that holds a to-be-attached member;

a wireless communication device being disposed on a back surface of the antenna device;

an arc-shaped guide part formed in the wireless communication device; and a screw member that penetrates through the guide part and fixes the wireless communication device to the antenna device, wherein the wireless communication device rotates relative to the antenna device while the screw member is guided by the guide part in a state in which the screw member is loosened.

2. The wireless communication unit according to claim 1, wherein a polarization angle of the wireless communication device is adjusted by the wireless communication device rotating relative to the antenna device.

3. The wireless communication unit according to claim 2, wherein the attachment member is installed on a back surface of the antenna body.

4. The wireless communication unit according to claim 2, wherein the screw member is a bolt, a screw thread is formed on a tip part of the bolt, and, in a state in which a neck part of the bolt penetrates through the guide part, a tip part of the bolt is screwed to a female screw part formed in the antenna device.

5. The wireless communication unit according to claim 2, wherein the guide part is an arc-shaped hole or an arc-shaped slot.

6. The wireless communication unit according to claim 2, wherein the attachment member includes an arm unit extending toward a side of the antenna device, and the mechanism and the structure are installed in the arm unit.

7. The wireless communication unit according to claim 2, wherein the wireless communication device is for wireless communication based on polarization multiplexing using vertical polarization and horizontal polarization.

8. The wireless communication unit according to claim 1, wherein the attachment member is installed on a back surface of the antenna body.

9. The wireless communication unit according to claim 8, wherein the screw member is a bolt, a screw thread is formed on a tip part of the bolt, and, in a state in which a neck part of the bolt penetrates through the guide part, a tip part of the bolt is screwed to a female screw part formed in the antenna device.

10. The wireless communication unit according to claim 8, wherein the guide part is an arc-shaped hole or an arc-shaped slot.

11. The wireless communication unit according to claim 8, wherein the attachment member includes an arm unit extending toward a side of the antenna device, and the mechanism and the structure are installed in the arm unit.

12. The wireless communication unit according to claim 8, wherein the wireless communication device is for wireless communication based on polarization multiplexing using vertical polarization and horizontal polarization.

13. The wireless communication unit according to claim 1, wherein the screw member is a bolt, a screw thread is formed on a tip part of the bolt, and, in a state in which a neck part of the bolt penetrates through the guide part, the tip part of the bolt is screwed to a female screw part formed in the antenna device.

14. The wireless communication unit according to claim 13, wherein the guide part is an arc-shaped hole or an arc-shaped slot.

15. The wireless communication unit according to claim 13, wherein the attachment member includes an arm unit extending toward a side of the antenna device, and the mechanism and the structure are installed in the arm unit.

16. The wireless communication unit according to claim 1, wherein the guide part is an arc-shaped hole or an arc-shaped slot.

17. The wireless communication unit according to claim 16, wherein the attachment member includes an arm unit extending toward a side of the antenna device, and the mechanism and the structure are installed in the arm unit.

18. The wireless communication unit according to claim 1, wherein the attachment member includes an arm unit extending toward a side of the antenna device, and the mechanism and the structure are installed in the arm unit.

19. The wireless communication unit according to claim 1, wherein the wireless communication device is for wireless communication based on polarization multiplexing using vertical polarization and horizontal polarization.

20. An angle adjustment method comprising:

adjusting an azimuthal angle and an elevation/depression angle of an antenna body of an antenna device by using a mechanism included in an attachment member of the antenna device;

loosening a screw member that penetrates through an arc-shaped guide part formed in a wireless communication device disposed on a back surface of the antenna device and fixes the wireless communication device to the antenna device;

adjusting a polarization angle of the wireless communication device by rotating the wireless communication device relative to the antenna device while the screw member is guided by the guide part in a state in which the screw member is loosened; and fixing the wireless communication device to the antenna device by fastening the screw member in a state in which adjustment of the polarization angle is finished.

* * * * *